United States Patent [19]

Hosogoe et al.

[11] Patent Number: 4,613,853
[45] Date of Patent: Sep. 23, 1986

[54] X-Y INPUT DEVICE

[75] Inventors: Junichi Hosogoe; Yuichi Ida; Motoyuki Suzuki, all of Miyagi, Japan

[73] Assignee: Alps Electric Co., Ltd., Japan

[21] Appl. No.: 630,944

[22] Filed: Jul. 16, 1984

[30] Foreign Application Priority Data

Jul. 14, 1983 [JP] Japan .................... 58-108263[U]

[51] Int. Cl.⁴ .............................................. G09G 1/00
[52] U.S. Cl. ................................. 340/710; 200/159 A
[58] Field of Search .......................... 340/710, 365 R; 200/159 RA, 275, 283

[56] References Cited

U.S. PATENT DOCUMENTS

| 2,761,936 | 9/1956 | Verkuil | 200/159 A |
| 3,250,882 | 5/1966 | Campbell et al. | 200/159 A |
| 4,177,367 | 12/1979 | Tirone et al. | 200/159 A |
| 4,464,652 | 8/1984 | Lapson et al. | 340/710 |

Primary Examiner—Marshall M. Curtis
Attorney, Agent, or Firm—Guy W. Shoup

[57] ABSTRACT

An X-Y input device known as a "mouse" includes at least one switch lever having a control end exposed through an upper case and an opposite end staked on the upper case. An annular holder for the rotatable ball of the mouse is secured to a lower case and the switch lever has a portion close to the staked end held between the upper case and the annular holder.

6 Claims, 18 Drawing Figures

X-Y INPUT DEVICE

BACKGROUND OF THE INVENTION

The present invention relates to an X-Y input device, and more particularly to an X-Y input device suitable for use as an input device associated with a graphic display apparatus.

Graphic display apparatus basically include a display screen, a display controller, a data channel, and an input device which may be of various types. One known input device is a "joystick" having a lever supported by a gimbal mechanism and tiltable by the operator in any direction. A control device detects the direction and angle of tilt of the lever and generates voltages or digital signals indicative of coordinate values in X and Y directions. This type of input device is disadvantageous however in that the range of angular movement of the lever is limited and data signals entered by the operator are relatively unstable.

In an effort to eliminate the above shortcomings, there has in recent years been developed an input device called a "mouse." One type of the mouse has a rotatable member such as a steel ball, and first and second driven rollers held in contact with the ball are rotated in response to rotation thereof. The first and second driven rollers have their axes of rotation extending substantially perpendicularly to each other. The mouse also includes first and second angle detector means often comprised of variable resistors or encoders for separately detecting the angles of rotation of the first and second driven rollers. The ball, first and second driven rollers, and first and second angle detector means are all housed in a casing.

The casing has an opening defined in its bottom with the ball partly projecting through the opening. In use, the casing is held by the operator to place the ball against a given base or surface. By moving the casing to cause the ball to roll on the surface in any desired direction, the first and second driven rollers are rotated about their own axes through angles dependent on the rolling movement of the ball. The directions and angles of rotation of the driven rollers are converted by the first and second angle detector means into voltages or digital signals corresponding to the rolling movement of the ball representative of coordinate values in X and Y directions. The generated signals are then entered into a display apparatus.

SUMMARY OF THE INVENTION

It is an object of the present invention to provide an X-Y input device of the type known as a mouse, which includes a casing having a rotatable ball and switch levers staked on an upper casing and held between the upper casing and an annular holder for the ball. In this way, the switch levers are held securely to effect stable switching operation even when the staked portions deteriorate in strength.

According to the present invention, there is provided an X-Y input device including a rotatable ball, and first and second driven rollers held in contact with the rotatable ball and rotatable in response to rotation of the rotatable ball for actuating respective detector means signalling the movement of the ball in X and Y coordinates. A casing for the X-Y input device has a lower opening through which the ball partially projects for rolling movement on a base and at least one switch lever is provided with an actuating portion exposed through the upper case and an opposite end staked on the upper case. The switch lever has a portion close to the staked end and sandwiched between the upper case and a dome-shaped holder for the rotatable ball.

The above and other objects, features and advantages of the present invention will become more apparent from the following description when taken in conjunction with the accompanying drawings in which a preferred embodiment of the present invention is shown by way of illustrative example

DESCRIPTION OF THE PREFERRED EMBODIMENT

Figure 1:
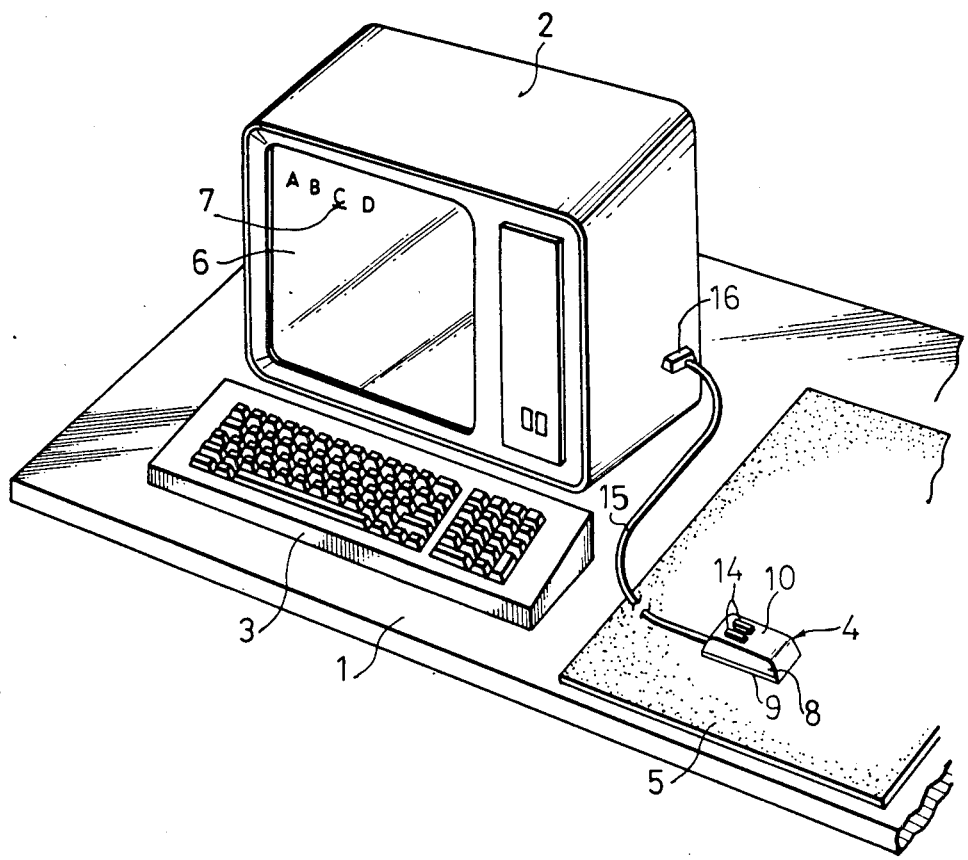
FIG. 1 is a perspective view of a graphic display apparatus including an X-Y input device according to the present invention.

FIG. 1 shows in perspective a graphic display apparatus incorporating therein an X-Y input device according to the present invention.

The graphic display apparatus illustrated in FIG. 1 comprises a display unit 2 mounted on a table 1 and having a screen, a controller, a data channel, an input device 3 having function keys, and an X-Y input device 4 according to the present invention. The X-Y input device 4 is operated by the operator on a sheet 5 placed on the table 1 to move a cursor 7 to any desired position on a screen 6 of the display unit 2.

Figure 2:
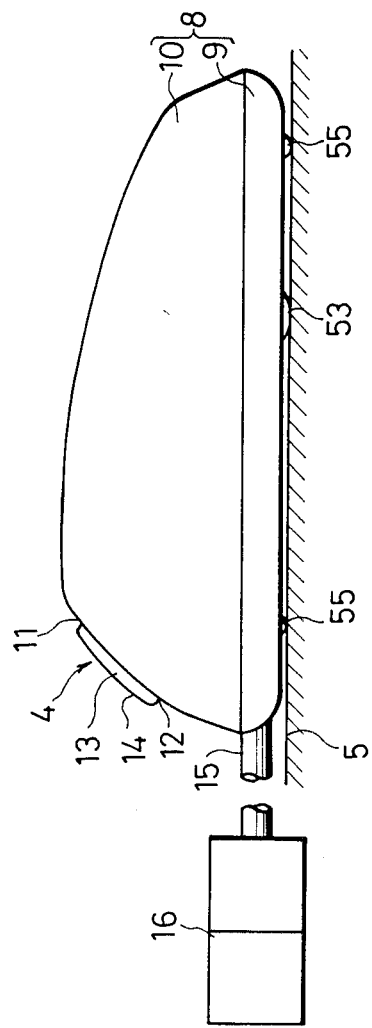
FIG. 2 is a side elevational view of the X-Y input device.

FIG. 2 shows the X-Y input device 4 in its side elevation.

The X-Y input device 4 has a casing 8 comprised of a lower case 9 and an upper case 10, the lower and upper cases 9 and 10 being molded of an ABS resin. The upper and lower cases 9 and 10 have stepped mating peripheral edges held in interfitting engagement with each other to prevent dust, water and other foreign matter from entering into the casing 8 through the joint between the lower case 9 and the upper case 10.

The upper case 10 is of a size which can be held by one hand of the operator. The upper case 10 includes an upper wall 11 having elongate slots 12 defined in a front position thereon and extending longitudinally of the uper case 10. Rectangular switch levers 13 are disposed in the casing 8, and have actuating portions 14 fitted repsectively in the slots 12 within the upper case 10 and projecting slightly through the upper wall 11.

As described below, pushbutton switches are located below respective switch levers 13 for deleting a portion of a displayed pattern immediately above or below the cursor 7, moving such a displayed pattern portion to another location, or effecting various other signal processing modes such as switching and control on the display unit 2. The displayed pattern can also be processed by the input device 3 itself. The display unit 2 and the X-Y input device 4 are interconnected by a cord 15 and a plug 16.

Figure 3:
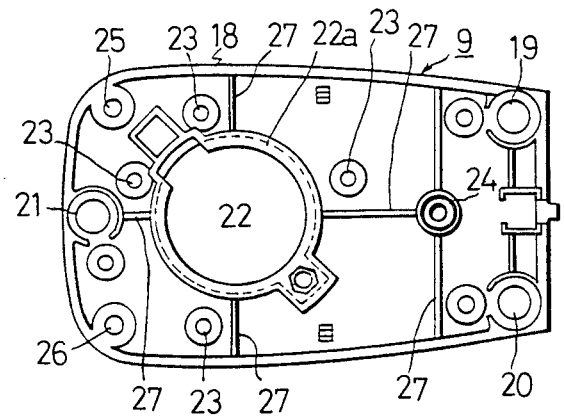
FIG. 3 is a plan view of the lower case of a casing of the X-Y input device.
Figure 4:
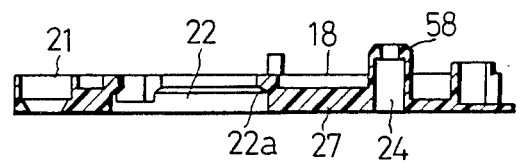
FIG. 4 is a vertical cross-sectional view of the lower case.
Figure 5:
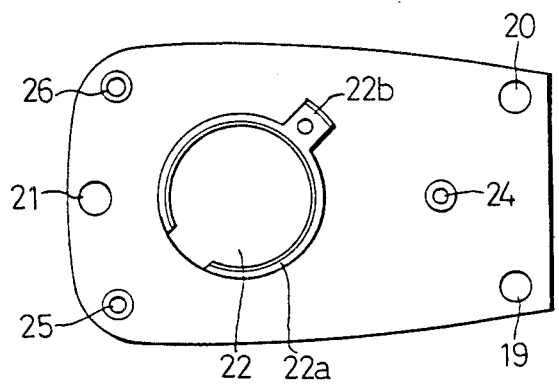
FIG. 5 is a bottom view of the lower case.

FIGS. 3 through 5 illustrate the lower case 9. The lower case 9 includes a bottom wall having an upstanding peripheral wall 18 extending continuously along the outer peripheral edge thereof. The bottom wall has small holes 19 and 20 at two front corners and a rear central portion thereof. The three holes 19, 20 and 21 are positioned such that an isosceles triangle would be formed by lines interconnecting the centers of these three holes 19, 20 and 21.

The bottom wall also has a central larger-diameter opening 22 and an annular step 22a formed along a lower edge of the larger-diameter opening 22. A rectangular recess 22b is defined in a portion of the lower edge of the opening 22. Four threaded holes 23 are defined in the bottom wall around the opening 22.

Holes 24, 25 and 26 for receiving screws are defined in the bottom wall at the front central portion and two rear corners thereof. The bottom wall also includes integral stiffener ribs 27 extending between the screw-insertion hole 24, the opening 22, and the peripheral wall 18.

Figure 6:
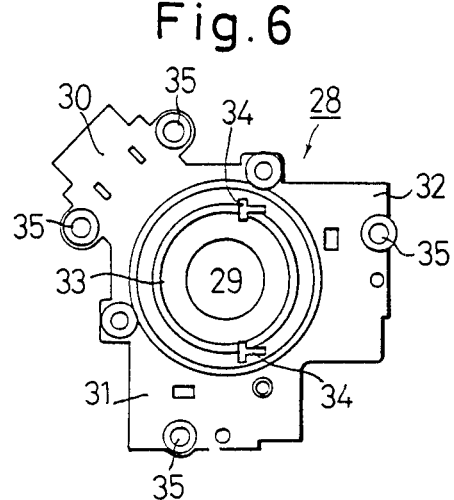
FIG. 6 is a plan view of an annular holder in the X-Y input device.
Figure 7:
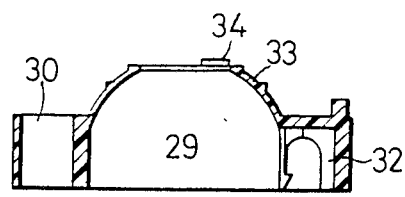
FIG. 7 is a vertical cross-sectional view of the annular holder.
Figure 8:
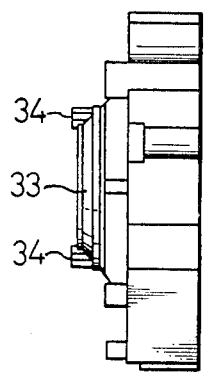
FIG. 8 is a side elevational view of the annular holder.

FIGS. 6 through 8 shown an annular holder 28 on which a rotatable ball is held.

The annular holder 28 is integrally molded of synthetic resin and has a central cavity 29 having an inside diameter larger than the diameter of the rotatable ball, and three recesses 30, 31 and 32 defined around the central cavity 29. The recesses 30, 31 and 32 serve to hold the position the driven rollers and frictional-force imposing roller and open into the central cavity 29.

The annular holder 28 has an integral dome-shaped protective cover 33 extending over the central cavity 29 for preventing the rotatable ball from wobbling in the cavity 29. T-shaped projections 34 are disposed on an upper surface of the protective cover 33 and serve as seats 34 against which lower surfaces of the switch levers 13 bear, the T-shaped projections 34 providing top surfaces of the annular holder 28, as shown in FIG. 8.

As illustrated in FIG. 6, the annular holder 28 has four threaded holes 35 defined in lateral sides of the recess 30 and ends of the recesses 31 and 32. The annular holder 28 can be fastened to the lower case 9 by screws extending threadedly into the threaded holes 23 in the lower case 9.

Figure 9:
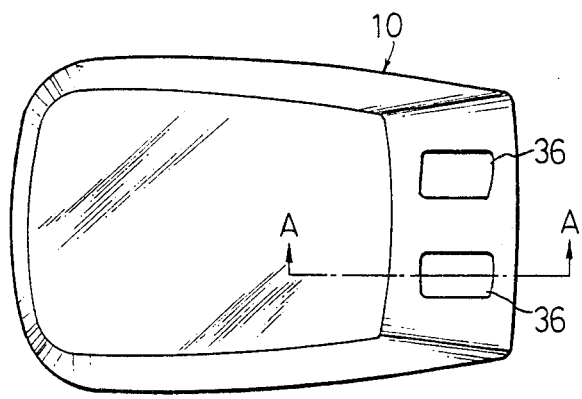
FIG. 9 is a plan view of the upper casing
Figure 10:
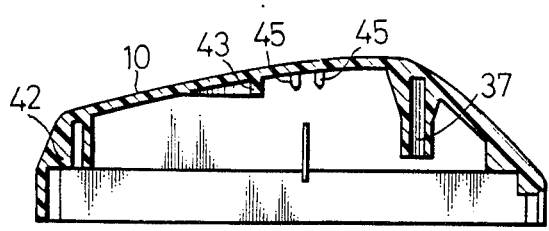
FIG. 10 is a verticle cross-sectional view of the upper case.
Figure 11:
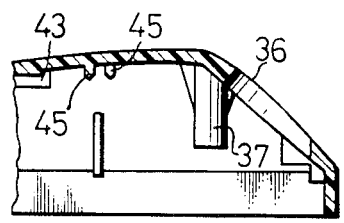
FIG. 11 is a cross-sectional view taken along line A—A of FIG. 9.
Figure 12:
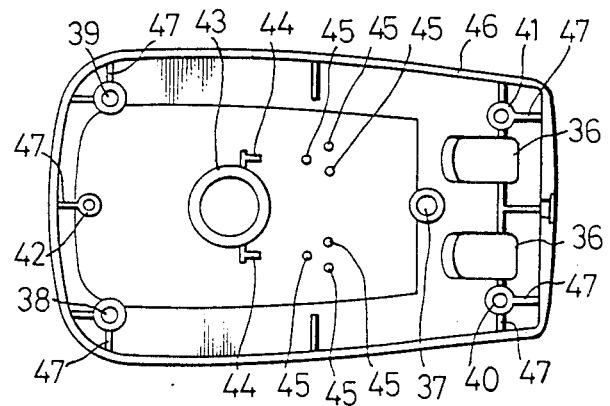
FIG. 12 is a bottom view of the upper case.

FIGS. 9 through 11 show the upper case 10. The upper wall 11 of the upper case 10 has an upwardly convex curved configuration such that it can be held in the hand of the user. The upper wall 11 has windows 36 defined in front portions thereof through which the actuating portions 14 of the two switch levers 13 extend. The upper wall 11 has threaded holes 37, 38 and 39 defined in inner surfaces thereof in registry with the screw-insertion holes 24, 25 and 26, respectively, in the lower case 9. The upper wall 11 also has recessed bosses 40, 41 and 42 formed on inner surfaces thereof in registry with the holes 19, 20 and 21, respectively, in the lower case 9.

The upper wall 11 also has an annular ridge 43 formed on an inner surface thereof in registry with the opening 22 in the lower case 9 and held in abutment against an upper surface of the protective cover 33 of the annular holder 28 to press the protective cover 33 downwardly for reinforcing the same. The upper wall 22 includes two integral T-shaped pressers 44 identical in shape to and in registry with the seats 34 on the annular holder 28. The switch levers 13 are fixed in position by two sets of three fused pins 45 adjacent to the pressers 44 and their ends being sandwiched between the pressers 44 and the seats 34.

The upper case 10 has a peripheral wall 46 extending along an outer peripheral edge thereof. The upper case 10 also has integral stiffener ribs 47 extending between the peripheral wall 46, the bosses 40, 41 and 42, and the threaded holes 37, 38 and 39.

Figure 13:
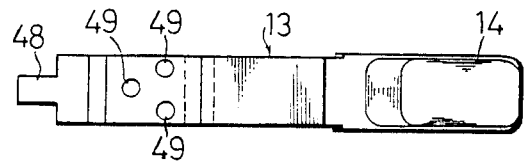
FIG. 13 is a plan view of a switch lever in the X-Y input device.
Figure 14:
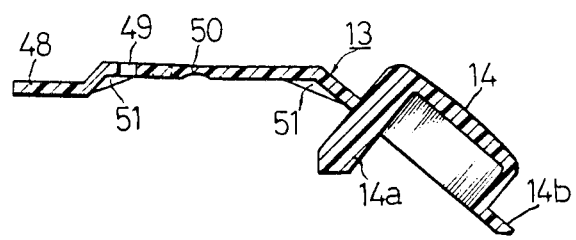
FIG. 14 is a vertical cross-sectional view of the switch lever.
Figure 15:
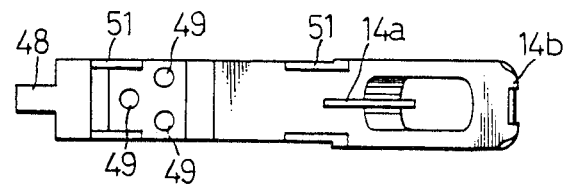
FIG. 15 is a bottom view of the switch lever.

FIGS. 13 through 15 illustrate one of the switch levers 13, the two switch levers 13 being of an identical configuration.

The switch lever 13 is integrally molded of synthetic resin and has an angularly bent cross section. The end forming the actuating portion 14 is generally cup-shaped and has a top wall from which an actuator 14a extends obliquely downwardly. The other end of the switch lever 13 has a narrower pinched portion 48, three small holes 49 defined therein and located inwardly of the pinched portion 48, and a thinned portion 50 located inwardly of the three small holes 49 for allowing the switch lever 13 to operate easily. The acutating portion 14 has a flange 14b directed away from the actuator 14a for abutment against an edge of the inside of the window 36 so as to serve as a stop against return movement of the switch lever 13 after it has been depressed. The switch lever 13 also includes stiffener ribs 51 formed on bent portions thereof.

Figure 16:
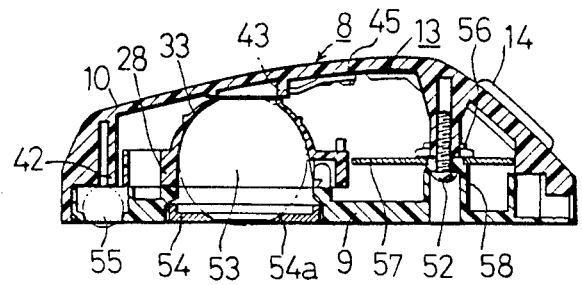
FIG. 16 is a vertical cross-sectional view of the assembled X-Y input device.

FIG. 16 shows the X-Y input device 4 as assembled.

The lower case 9 and the upper case 10 are fastened to each other by screws threaded through screw holes 24, 25 and 26 into the threaded holes 37, 38 and 39. The rotatable ball, designated at 53, is made of steel and disposed centrally in the casing 8. The ball 53 is retained in the casing 8 by the annular holder 28 and a cover 54 fitted in the step 22a around the opening 22 and secured to the lower case 9 by screws (not shown). The ball 53 has a lower end exposed downwardly through an opening in the cover 54 and is rotatable within the cavity 29 in the annular holder 28 by rolling movement on the base 5 (FIG. 1).

Figure 17:
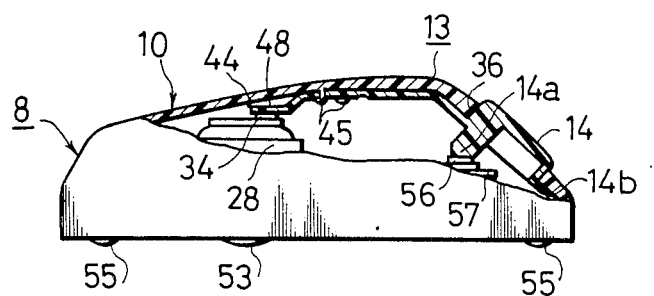
FIG. 17 is a side elevational view, partly in cross section, of the X-Y input device, showing the switch lever as attached.

The two switch levers 13 are fixed at end portions thereof to the upper wall of the upper case 10 by the fused pins 45. More specifically, each switch lever 13 can be fixed in position by inserting the three pins 45 through the holes 49 in the switch lever 13 and then fusing and staking the distal ends of the pins 45. With the switch levers 13 thus fastened, the actuating portions 14 are angularly movable about their staked portions under their own resiliency. As shown in FIG. 17, the pinched portion 45 of each switch lever 13 which is located closely to the staked portion thereof is sandwiched between the seat 34 on the annular holder 28 and the corresponding presser 44 on the upper wall of the upper case 10. This allows the switch lever 13 to remain resiliently angularly movable about the staked portion even if the staked portion deteriorates in its strength of attachment.

The pushbutton switch, denoted at 56 in FIG. 17, is operated by the switch lever 13, and mounted on a substrate 57 secured to the upper end of a boss 58 (FIG. 16) of the lower case 9. The actuator 14a of the switch lever 13 is disposed in confronting relation to the pushbutton switch 56. When the actuating portion 14 is depressed by the user, the actuator 14a engages the pushbutton switch 56 to enable the same to effect desired switching operation.

Under normal conditions of use, the dome-shaped protective cover 33 of the annular holder 28 is slightly spaced from an upper surface of the ball 53 and does not obstruct rolling movement of the ball 53. When the X-Y input device 53 is turned over or dropped, the protective cover 33 prevents the ball 53 from moving toward the upper case 10. Accordingly, the surfaces of the ball 53 and the upper case 10 are protected against unwanted damage. Since the rotation of the ball 53 should be detected accurately, the ball 53 usually comprises a steel ball, as described above, which is heavy and provides a highly accurate surface. If the ball 53 were allowed to contact the inner surface of the upper case, the surface of the ball 53 could be damaged and accurate and stable detection of the rotation of the ball 53 would not be possible. To prevent such a problem, an upper portion of the ball 53 is covered with the dome-shaped protective cover 33 which has a curvature close to that of the ball 33.

Figure 18:
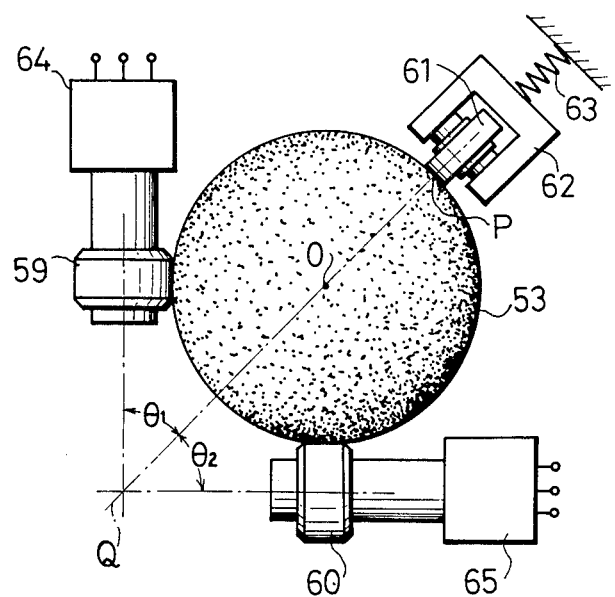
FIG. 18 is a schematic diagram illustrative of the principle of operation of the X-Y input device to detect the rotation of the ball.

The principle of operation of the X-Y input device for detecting rotation of the ball 43 will be described with reference to FIG. 18.

The ball 53 is pressed against first and second driven rollers 59 and 60 by a frictional-force imposing roller 61. The first and second driven rollers 59 and 60 have axes extending perpendicularly to each other and are kept in contact with the peripheral surface of the ball 53 in mutually perpendicular directions. The frictional-force imposing roller 61 is located on a straight line passing through a point Q where the axes of the first and second driven rollers 59 and 60 intersect and the center O of the ball 53 for pressing the ball 53 against the first and second driven rollers 59 and 60 under equal forces. The frictional-force imposing roller 61 is rotatably supported by a casing 62 biased by a spring 63 for resiliently pressing the ball 53 against the first and second driven rollers 59 and 60.

The first and second driven rollers 59 and 60 have shafts on which first and second rotation detector means 64 and 65 are mounted respectively. The first and second rotation detector means 64 and 65 include encoders, rotary variable resistors, and other components for detecting the rotations of the driven rollers so that the rotation of the ball 53 can be detected as components in the X- and Y-axis directions to thereby determine the manner in which the ball 53 rotates.

Although a certain preferred embodiment has been shown and described, it should be understood that many changes and modifications may be made therein without departing from the scope of the appended claims.

We claim:

1. An X-Y input device comprising a casing supporting a rotatable ball extending partially through a lower wall of said casing and means including first and second driven rollers held against said rotatable ball with their axes of rotation extending orthogonally, for generating signals corresponding to the X and Y coordinates of the movement of said ball, an annular holder fixedly secured to said casing and having a domed portion extending over and covering the upper portions of said ball and at least one switch lever, formed as an integral piece extending substantailly linearly, having one end portion extending partially through an upper portion of said casing to form an actuation portion, a mid portion extending along and held at one point to the underside of the upper portion of said casing, and its other end portion adjacent said mid portion and held between the underside of the upper portion of said casing and an upper portion of said domed portion.

2. An X-Y input device according to claim 1, the mid portion of each said switch lever having at least one hole adapted to receive a respective pin extending from the underside of the upper portion of said casing to hold said mid portion thereto.

3. An X-Y input device according to claim 2, each said pin being bent to secure said mid portion to the upper portion of said casing.

4. An X-Y input device according to claim 1, said upper portion of said domed portion having a seat receiving said other end portion of said switch lever and the underside of the upper portion of said casing having a depending projection holding said other end portion against said seat.

5. An X-Y input device according to claim 4, each of said seat and said projection having a T-shaped surface.

6. An X-Y input device according to claim 1, each said switch lever being bent angularly with stiffener ribs at the bent portion thereof, and the portion being held to the underside of the upper wall of said casing having a reduced thickness to render the switch lever resiliently flexible.

* * * * *